United States Patent [19]

Foster

[11] Patent Number: 5,234,309
[45] Date of Patent: Aug. 10, 1993

[54] CONTAINER FOR HOLDING MATERIAL WHICH INCLUDES A DRAINABLE LIQUID

[76] Inventor: Raymond K. Foster, P.O. Box 1, Madras, Oreg. 97741

[21] Appl. No.: 778,522

[22] Filed: Oct. 18, 1991

Related U.S. Application Data

[60] Division of Ser. No. 682,422, Apr. 8, 1991, Pat. No. 5,139,133, which is a continuation-in-part of Ser. No. 516,972, Apr. 30, 1990, Pat. No. 5,145,309.

[51] Int. Cl.$^5$ .................................................. B65G 25/04
[52] U.S. Cl. .................................. 414/525.9; 198/750; 414/501; 414/525.1; 210/805
[58] Field of Search ............... 198/750, 502.4; 298/24, 298/27; 296/183, 184; 414/525.1, 501, 525.9, 288, 325; 210/622, 805, 194, 526

[56] References Cited

U.S. PATENT DOCUMENTS

| | | |
|---|---|---|
| 4,276,981 | 7/1981 | Hurt et al. ........................... 198/866 |
| 4,601,385 | 7/1986 | Sloan et al. ......................... 198/580 X |
| 4,611,708 | 9/1986 | Foster ............................. 414/525.9 X |
| 4,623,197 | 11/1986 | Stluka ................................ 298/24 X |
| 5,021,156 | 6/1991 | Sloan ............................... 296/184 X |
| 5,055,204 | 10/1991 | Bogart ............................. 210/805 X |

*Primary Examiner*—Frank E. Werner
*Attorney, Agent, or Firm*—Delbert J. Barnard

[57] ABSTRACT

A wide floor member (10) is supported by slide bearings (18) which are located on a pair of spaced apart guide beams (12). The floor member has opposite side portions each of which includes a top portion (38, 40). A liquid collecting channel (46) is located between the top portions (38, 40). Liquid in garbage or some other material which is supported by the floor drains into the channels (46). This liquid flows to a transverse collection trough (94) having an outlet (96). The liquid flows through the outlet (96) into a tank (88). A pump (98) may pump the liquid back onto the material within the container (74).

4 Claims, 4 Drawing Sheets

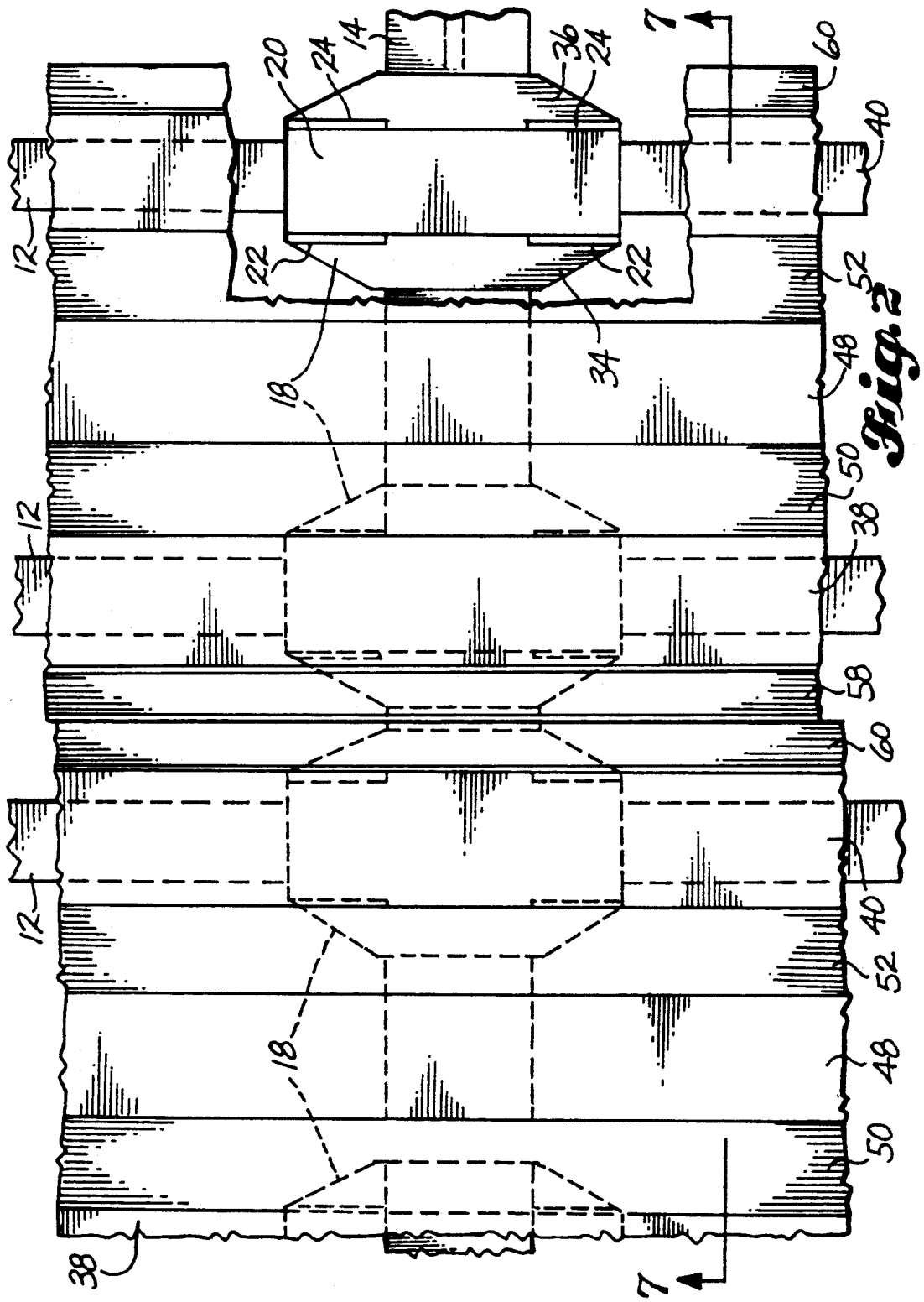

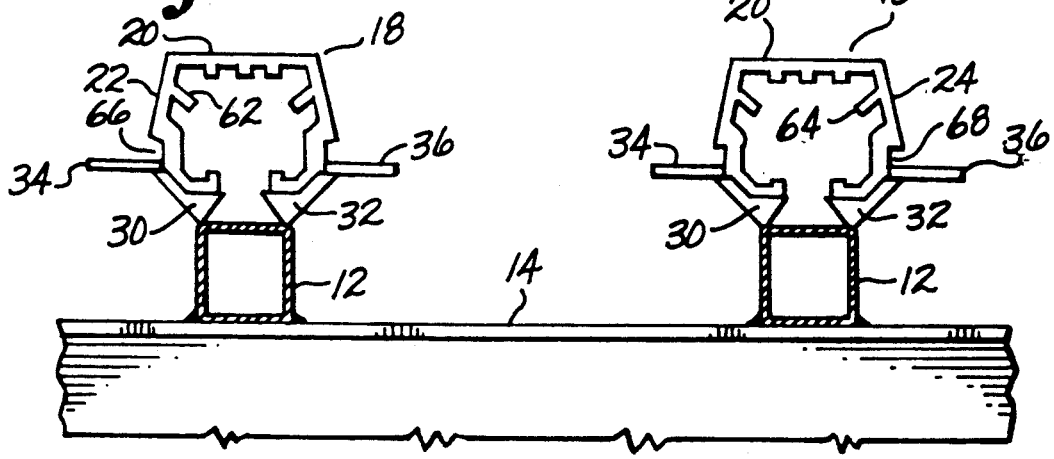
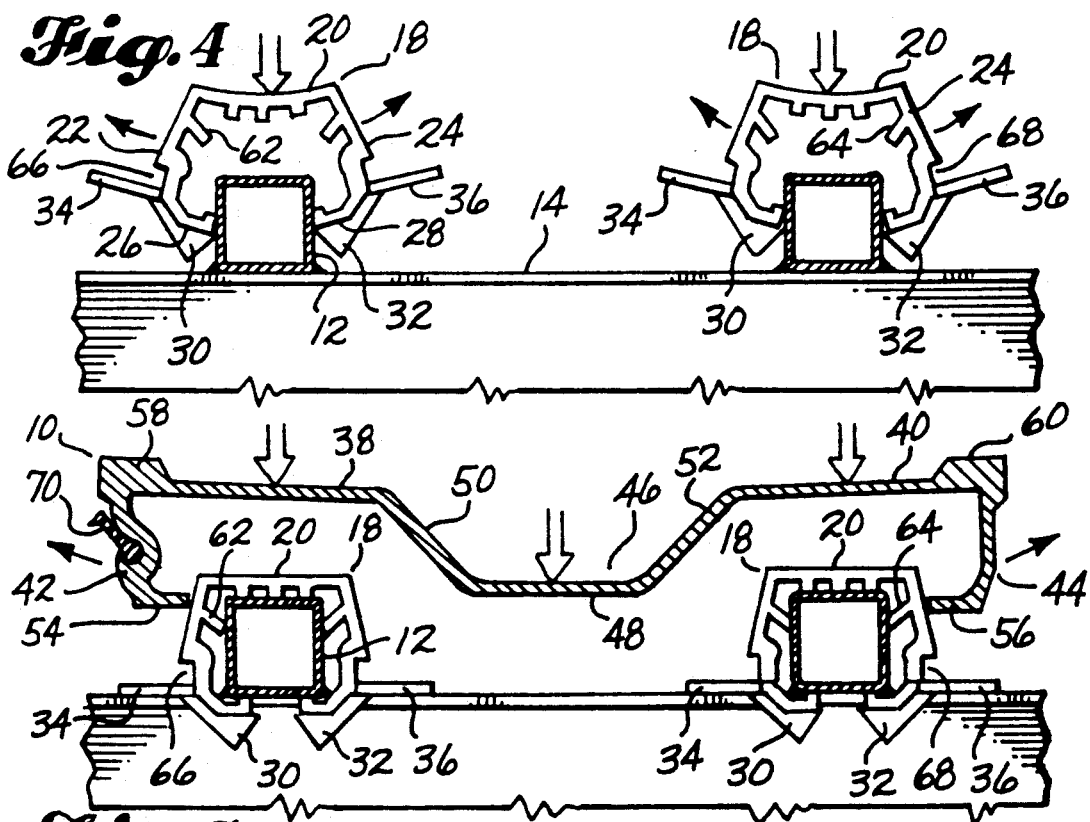
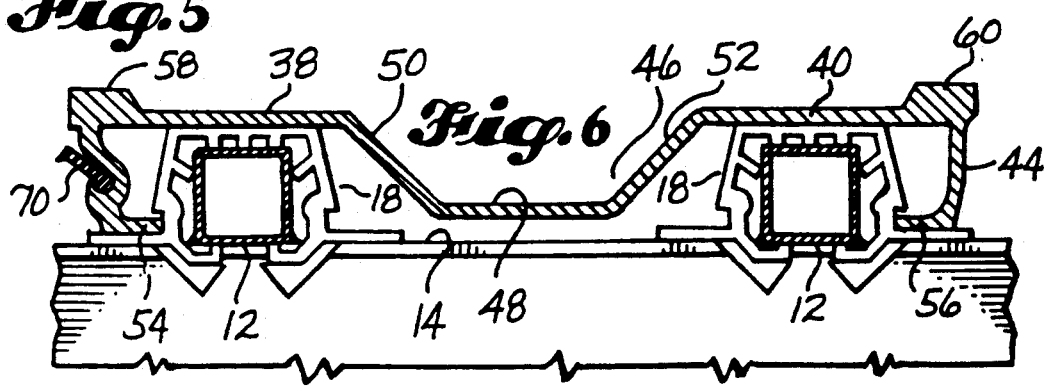

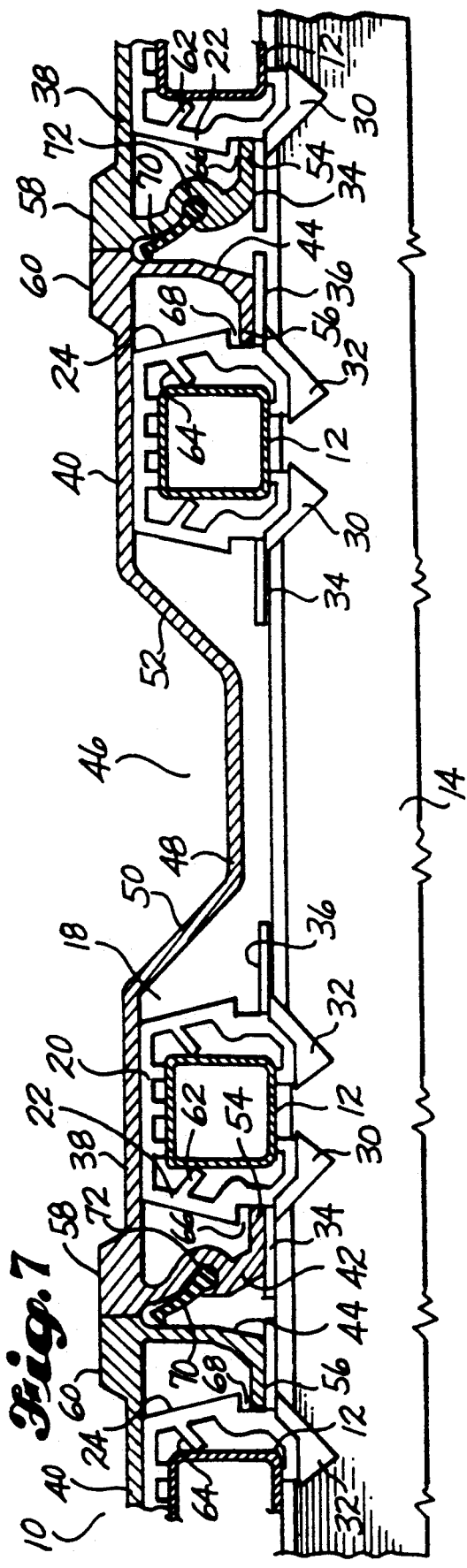
Fig. 7
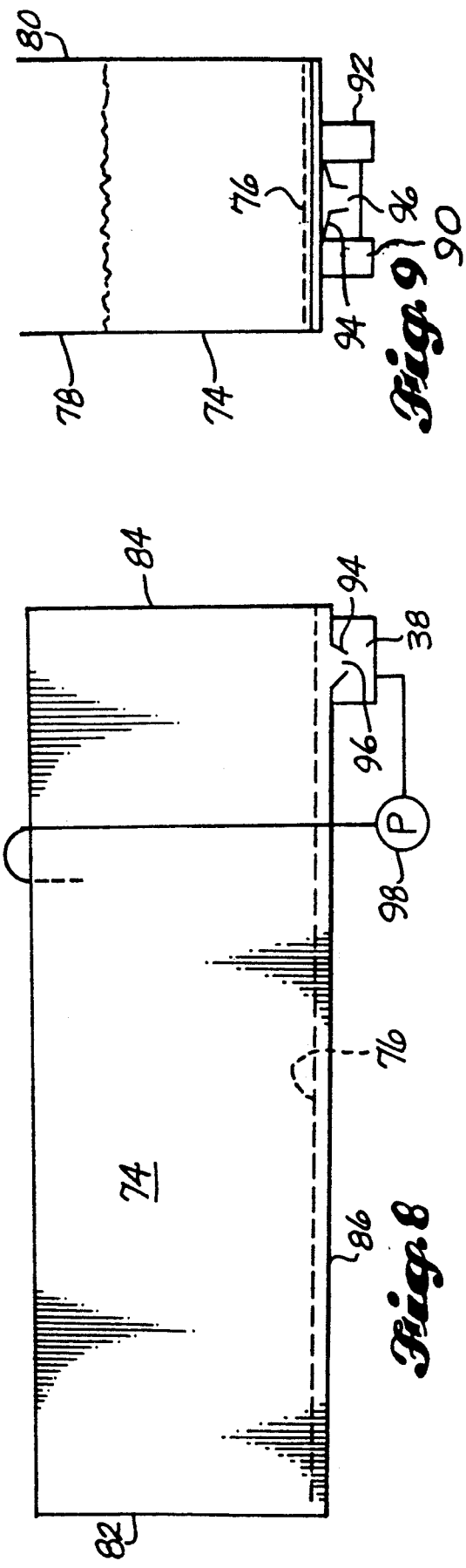
Fig. 8
Fig. 9

CONTAINER FOR HOLDING MATERIAL WHICH INCLUDES A DRAINABLE LIQUID

RELATED APPLICATION

This application is a division of my copending U.S. application Ser. No. 07/682,422 (now U.S. Pat. No. 5,139,133, filed Apr. 8, 1991, as a continuation-in-part of my copending application Ser. No. 07/516,972, filed Apr. 30, 1990, and now U.S. Pat. No. 5,145,309.

TECHNICAL FIELD

This invention relates to reciprocating floor conveyors used in containers for holding and/or transporting a material which includes a drainable liquid, such as garbage. More particularly, it relates to a reciprocating floor conveyor for removing the material out from the container and a system for collecting and disposing of liquid which drains from the material while it is in the container.

BACKGROUND INFORMATION

It is known to deposit garbage into containers which when full of garbage are transported to a land fill or other receiving site for the garbage. It is also known to provide such containers with reciprocating floor conveyors for facilitating the removal of garbage from the containers. My U.S. Pat. No. 4,785,929, granted Nov. 22, 1988, discloses a floor member and support bearing system for a reciprocating floor conveyor which has been used in garbage collection containers. My U.S. Pat. No. 5,000,647, granted Mar. 19, 1991, discloses a hydraulic drive assembly for powering the reciprocating floor conveyor, and a desired sequence of operation.

Herein the term "container" is used to mean a truck box, a trailer box, a transport container and fixed installation containers. A transport container is a container which is moved on flatbed trucks, rail cars, and ships. These containers all include a bottom, two sidewalls and two end walls, one of which is openable. Some include a top. The bottom is formed by or includes a reciprocating floor conveyor.

A principal object of the present invention is to provide in a container for garbage or other liquid including material, a reciprocating floor conveyor and a liquid collection and disposal system. A further object of the invention is to provide an improved floor member which is adapted to facilitate collection of liquid which drains from the material within the container.

DISCLOSURE OF THE INVENTION

According to an aspect of the invention, the floor members of a reciprocating floor conveyor are each provided with a liquid collecting channel extending longitudinally of the floor member. The liquid collecting channel is located between a pair of top portions of the floor member which extend longitudinally of the floor member.

The sidewalks of the liquid collecting channel may slope upwardly and outwardly from a bottom of the channel to the top portions. The top portions may include thick regions upstanding from the top portions, and extending longitudinally of the floor member. The floor member may include sidewalls and inwardly directed bottom flanges which are spaced vertically below the top portions and laterally outwardly from the liquid collecting channel.

In accordance with an aspect of the invention, each floor member is supported by a pair of laterally spaced apart supporting, guide beams. The guide beams extend longitudinally of the conveyor. Bearings are positioned on the guide beams. The top portions of the floor member set down on top portions of the bearings. The bearings are positioned between the sidewalls of the floor members and the sidewalls of the liquid collecting channels.

According to another aspect of the invention, the reciprocating floor conveyor is located in a container for holding a material which includes a drainable liquid. This container comprises sidewalls and a bottom. The bottom includes the reciprocating floor conveyor. The container also includes a liquid collection region in which liquid drainage from the material is collected. This region includes a transverse collection trough and the trough may be positioned at one end of the conveyor. The trough directs the liquid to a holding tank.

According to a further aspect of the invention, a container is provided which includes sidewalls and a bottom, a reciprocating floor conveyor on the bottom, a liquid collection region, positioned to collect liquid drainage from the material within the container, and a pump connected to pump collected liquid from the collection region up to an upper region of the material in the container. In preferred form, the floor members of such conveyor include central, liquid collecting channels extending longitudinally of the floor members, for collecting the drainable liquid. Also in preferred form, seals are provided between adjacent floor members. Gaps between adjacent floor members include a narrow inlet spaced substantially above the bottom of the liquid collecting channels. The floor members may include narrow, thick regions, upstanding from the side borders of the floor members. These thick regions serve to elevate the inlet to the gap. They also deepen the liquid collecting channel and provide support regions for solid objects in the material.

Other objects, features and advantages are hereinafter described in the description of the best mode of the invention.

BRIEF DESCRIPTION OF THE DRAWINGS

Like reference numerals are used to designate like parts throughout the several views of the drawings, and:

FIG. 2 is a fragmentary top plan view of adjacent floor members, with a portion of a floor member cut away to disclose a slide bearing;

FIG. 3 is a sectional view taken through a pair of adjacent guide beams, showing a bearing sitting on top of each guide beam;

FIG. 4 is a view like FIG. 3, showing a downward force applied to the bearings to cause the sides of the bearings to swing apart;

FIG. 5 is a view like FIGS. 3 and 4, showing a floor member sitting on the two bearings and a downward force being applied to the floor member;

FIG. 6 is a view like FIGS. 3-5, but showing the floor member installed;

FIG. 7 is a view like FIG. 6, but on an enlarged scale, and showing portions of two additional floor members;

FIG. 8 is a schematic side elevational view of a container for material such as garbage; and FIG. 9 is an end elevational view of the container of FIG. 9, such view showing a liquid collection tank located at the discharge end of a reciprocating floor conveyor that is in the container, substantially at the transverse center of the container.

BEST MODE FOR CARRYING OUT THE INVENTION

Figure 1:
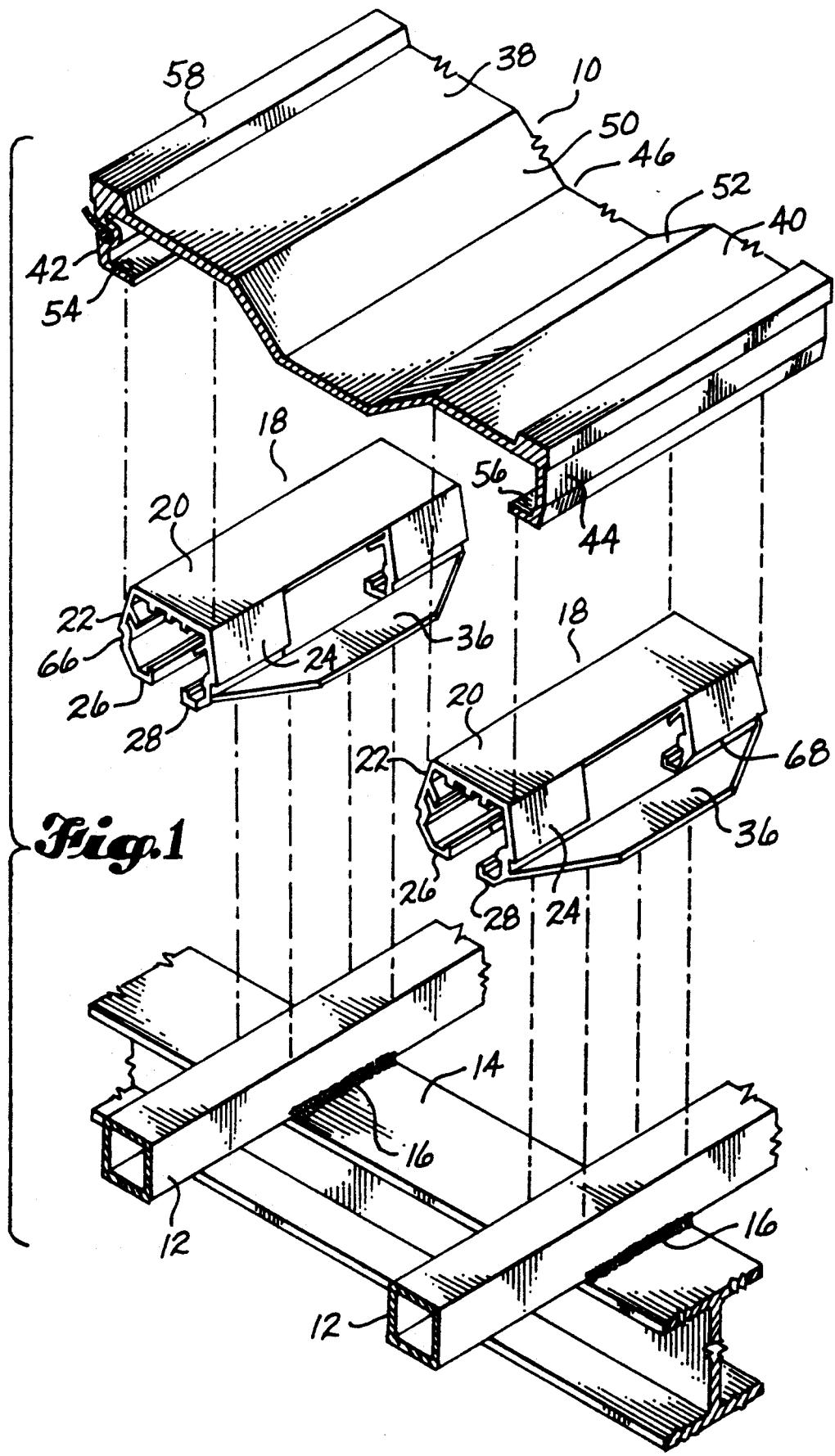
FIG. 1 is an exploded fragmentary pictorial view of slide bearings spaced above guide beams and a floor member spaced above the bearings.

The drive mechanism for moving the floor members 10 is per se not a part of the present invention. By way of typical and therefore nonlimitive example, the drive mechanism may be like the drive mechanism disclosed in my aforementioned U.S. Pat. No. 5,000,647, granted Mar. 19, 1991.

FIGS. 1–8 show supporting framework for reciprocating floor members 10. Such framework includes a pair of longitudinal guide beams 12 for each floor member 10. The floor members 10 and the guide beams 12 both extend substantially the full length of the conveyor. The number of floor members 10, and the length of the floor members 10, may vary from one floor to the next. As disclosed in my copending application Ser. No. 07/516,972, filed Apr. 30, 1990, now U.S. Pat. No. 5,145,309 and entitled Container For Liquid Bearing Material, a typical floor may include fifteen side-by-side floor members 10.

In preferred form, the guide beams 12 are fashioned from square steel tubing measuring one inch by one inch in cross section. The guide beams 12 are supported by a plurality of longitudinally spaced apart transverse beams 14. The guide beams 12 are welded to the transverse beams 14 at side locations 16. A plurality of bearings 18 are installed on each guide beam 12. The bearings 18 shown in FIGS. 1–8 are installed at each location where a guide beam 12 crosses over a transverse beam 14. The bearings 18, and the method of their installation, are described in detail in my aforementioned U.S. Pat. No. 4,785,929, granted Nov. 22, 1988. As disclosed in that patent, each bearing 18 includes a top 20, opposite sidewalls 22, 24, lock flanges 26, 28, cams 30, 32, and wings 34, 36. As shown by FIG. 4, a bearing 18 is installed by first positioning it on top of a guide beam 12, with its cams 30, 32 positioned on top of a guide beam 12, as shown by FIG. 4. Then, a downward force is applied to the bearing 18. As shown by FIG. 5, this causes the cams 30, 32 to move downwardly along opposite sides of the guide beam 12. In the process, the sidewalls 22, 24 are spread apart. Downward movement is continued until the lock flanges 26, 28 become positioned below the guide beams 12, as shown by FIG. 6. The lock flanges 26, 28 extend through opposite end regions of the bearing. The lower central region of the bearing 18 is configured to engage an upper flange portion of a transverse beam 14.

Each floor member 10 comprises a pair of laterally spaced apart top portions 38, 40, a pair of opposite sidewalls 42, 44 and a central liquid collecting channel 46. Channel 46 includes a bottom 48 which is offset below the top portions 38, 40, and a pair of sidewalls 50, 52. Sidewalls 50, 52 slope upwardly and outwardly from the bottom 48, to lines of connection with the top portions 38, 40. Floor member 10 includes a pair of bottom flanges 54, 56. Flange 54 extends laterally inwardly from sidewall 42. Flange 56 extends laterally inwardly from sidewall 44. Flanges 54, 56 are coplanar and are spaced vertically below the top portions 38, 40. The floor members 10 may include thick regions 58, 60 which are upstanding from the top portions 38, 40, adjacent the sidewalls 42, 44.

The installation of the floor members 10 is shown by FIGS. 6 and 7. Bearings 18 include ribs 62, 64 on the inner sides of sidewalls 22, 24. The sidewalls 22, 24 have outer side surfaces which slope outwardly as they extend downwardly from the top 20 of the bearing 18. FIG. 6 shows a floor member 10 positioned on bearings 18 on a pair of adjacent guide beams 12. The inner edges of the flanges 54, 56 contact the sloping side surfaces of sidewall 22 on one bearing 18 and sidewall 24 on the second bearing 18. When a downward push is applied on the floor member 10, the inner edges of the flanges 54, 56 exert laterally inwardly directed forces on such sidewalls 22, 24, causing the ribs 62, 64 on such sidewalls 22, 24, to bend, and the sidewalls 22, 24 to swing inwardly. The downward force on the floor member 10 is continued until the flanges 54, 56 are within the slots 66, 68.

As best shown by FIGS. 2 and 7, there may be contact between the adjacent edges of adjoining wings 34, 36, below the separation line between adjacent floor members 10. Sidewall 42 of each floor member 10 preferably carries a seal strip 70 which extends the full length of the floor member 10. Each seal strip 70 includes a base portion which is received within a channel 72, and a free edge portion which makes contact with a confronting surface on the sidewall 44 of the adjacent floor member 10. The seal construction may be of a type disclosed in my U.S. Pat. No. 4,896,761, granted Jan. 30, 1990. This construction is preferred because the seal member 70 is located within a protected cavity between the adjacent floor members 10. The construction of the seal and its advantages are disclosed in U.S. Pat. No. 4,896,761.

The channel 46 performs several functions. Firstly, it serves as a central strengthening rib for the floor member 10. This enables a relatively wide construction of the floor member, and makes it possible to make regions 38, 40, 48, 50, 52 relatively thin. The cross sectional shape of the floor member 10 in these regions 38, 40, 48, 50, 52 replaces a thick planar top panel, such as is disclosed in my U.S. Pat. No. 4,858,748, granted Aug. 22, 1989 (FIGS. 1, 2, 3, 5, 6, 9, and 10). Secondly, and quite importantly, channel 56 serves to collect liquid which may be in the load which is being carried by the container in which the reciprocating floor conveyor is situated. The seal strips 70 are provided to seal against leakage between adjacent floor members 10. However, this type of seal does not provide a perfect seal. As can be seen by FIG. 7, any liquid collected in the central region of a floor member 10, below the upper surfaces of raised, thick regions 58, 60, cannot flow through the gap between adjacent floor members 10. The inlets into the gaps, and thus into the regions of the seals 70, are at the level of the tops of regions 58, 60. The channels 46 provide a considerable liquid storage space below these inlets.

FIGS. 8 and 9 are like FIGS. 1 and 3 in my aforementioned U.S. Pat. No. 5,145,309. The contents of this application are hereby incorporated herein by reference. Referring to FIG. 8, a container 74 is shown to include a reciprocating floor conveyor 76. The container 74 may be an open top container or it may have a closed top. Container 74 includes two sidewalls 78, 80 (FIG. 9), a front end wall 82 and a rear door 20 (FIG. 8). The rear door may be of the type shown on page 32 of the August 1982 issue of World Waste.

The reciprocating floor conveyor 76 includes a plurality of side-by-side floor members 10 (e.g. fifteen floor members). As previously stated, the drive system for the conveyor may be of the type disclosed in my U.S. Pat. No. 5,000,647, granted Mar. 19, 1991. FIG. 8 shows the container 74 has a bottom 86 which slopes downwardly as it extends rearwardly. A liquid collection and holding tank 88 is provided at the rear end of the conveyor 76. As shown by FIG. 9, the tank 82 may be positioned between two main frame beams 90, 92. Or, it may be positioned adjacent a sidewall of the container 74, such as disclosed in the aforementioned U.S. Pat. No. 5,145,309. The container 74 is provided with a liquid collection trough 94. Trough 94 extends crosswise of the container 70 and includes a tubular outlet 96. It has a bottom which slopes inwardly to the tubular outlet 96. The sloping bottom 86 allows liquid which settles down to the bottom of the container 74 to flow rearwardly to the transverse collection trough 88. The collection trough 88 collects this water and moves it on to the outlet 96. The outlet 96 directs the liquid down into the holding tank 88. As schematically shown in FIG. 8, water in tank 88 may be pumped by a pump 98 up to the top of the container 74, and discharged back into the contents of the container 74. By way of example, if container 74 is containing a load of garbage, after a period of time liquid in the garbage will drain into the tank 88. It will then be pumped by a pump 98 up to the top of the container 74, and discharged back into the garbage. In this manner, the system can handle a greater amount of liquid than the tank 88 will hold. When the liquid is pumped back into the garbage, it will settle slowly back towards the bottom of the conveyor 76.

The construction of the floor members 10 facilitates delivery of the liquid by the reciprocating floor conveyor 76 to the collection trough 74. As previously stated, liquid will be collected in the channel 46, and in the region above top portions 38, 40, flanked by the raised, thick regions 58, 60. The liquid collected in the floor trough regions, below the top surface of the raised regions 58, 60, will flow rearwardly to the transverse collection trough 94.

Heavy solid objects resting on the floor 76 will contact the raised, thick regions 58, 60. The presence of these raised regions 58, 60 will permit the top portions 38, 40 and the channel walls 48, 50, 52 to be made relatively thin, and still result in a long life floor member. This is because the wear imposed by heavy solid objects will be primarily absorbed by the regions 58, 60.

Floor member 10 is preferably constructed from aluminum. Specifically, it is an aluminum extrusion, with a cross-sectional shape such as shown in FIG. 7, for example. The bearings 18 are flanked on their outside by the floor member sidewalls 42, 44, and on their inside by the channel 46. The use of two guide beams 12 for each floor member 10, and the construction of the floor member 10 to include the channel 46, permits a relatively wide construction of the floor member 10. As illustrated in FIG. 7, the bearings 18 are of a type which in the past has been used to support a single floor member. See my U.S. Pat. No. 4,858,748, granted Aug. 22, 1989. The width of the portion of floor member 10 which is located between the two bearings 18 is wider than the portions which rest on the bearings 18. Accordingly, as shown by FIG. 7, the floor member 10 can be about three times the width of a standard floor member, of the type shown in U.S. Pat. No. 4,858,748 (FIG. 13), for example. As shown by FIG. 7, the channel bottom 48 may extend downwardly to a level that is closely adjacent the level of the bearing wings 34, 36. Thus, the liquid collecting channel 46 can be made to be relatively deep. A greater depth not only increases the liquid collection volume; it strengthens the floor member.

The outside wings 34, 36 of the bearings 18 may contact, to provide mutual bracing. The benefit of this construction is disclosed in my U.S. Pat. No. 4,492,303, granted Jan. 8, 1985.

The disclosed embodiment provides an example of the invention. The coverage is not to be limited to the disclosed construction, but rather is to be determined from the claims which follow, interpreted in accordance with established rules of patent claim interpretation, including use of the doctrine of equivalents.

What is claimed is:

1. A container for holding material which includes a drainable liquid, comprising:
   sidewalls and a bottom;
   said bottom including a reciprocating floor conveyor comprising a plurality of elongated floor members which in use are driven in one direction for advancing said material and are retracted in an opposite direction, said conveyor having an end;
   said container including a liquid collection trough positioned to collect liquid drainage from the material, said trough including an outlet;
   a holding tank positioned below said outlet; and
   said floor members each including a liquid collecting channel extending lengthwise of the floor member, and opposite side portions flanking said channel, said side portions having coplanar top portions, and said channel having a bottom which is offset vertically downwardly from said top portions,
   whereby liquid within the material drains down to the floor members and flows into said channels and flows through said channels to and into the collection trough, and from the outlet of the collection trough into the holding tank.

2. A container according to claim 1, comprising slide bearings supporting said floor members, said slide bearings being positioned below the side portions of the floor members.

3. A container according to claim 1, wherein each floor member includes a pair of laterally spaced apart thick regions, said thick regions upstanding from the top portions of the floor member, extending longitudinally of the floor member, and being connected to said top portions.

4. A container according to claim 3, comprising a seal between adjacent floor members.

* * * * *